US 9,971,233 B2

(12) United States Patent
Kito

(10) Patent No.: US 9,971,233 B2
(45) Date of Patent: May 15, 2018

(54) PROJECTOR AND METHOD OF CONTROLLING PROJECTOR

(71) Applicant: SEIKO EPSON CORPORATION, Tokyo (JP)

(72) Inventor: Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/065,263

(22) Filed: Mar. 9, 2016

(65) Prior Publication Data

US 2016/0274445 A1 Sep. 22, 2016

(30) Foreign Application Priority Data

Mar. 17, 2015 (JP) ................................. 2015-053036
Mar. 17, 2015 (JP) ................................. 2015-053037

(51) Int. Cl.
*G03B 21/20* (2006.01)
*G03B 21/16* (2006.01)

(52) U.S. Cl.
CPC ......... *G03B 21/16* (2013.01); *G03B 21/2026* (2013.01); *G03B 21/2053* (2013.01)

(58) Field of Classification Search
CPC ........ G03B 21/00; G03B 21/16; G03B 21/20; F21V 23/00; F21V 25/02; F21V 29/50; F21V 29/67; F21S 2/00; H04N 5/74
See application file for complete search history.

(56) References Cited

U.S. PATENT DOCUMENTS

| 2004/0113567 | A1 | 6/2004 | Yamauchi et al. |
| 2004/0183472 | A1 | 9/2004 | Kamoi et al. |
| 2005/0157275 | A1* | 7/2005 | Colpaert ............. H04N 5/7416 353/97 |
| 2009/0035000 | A1 | 2/2009 | Oka |
| 2010/0194311 | A1* | 8/2010 | Terashima ......... H05B 41/2928 315/307 |

FOREIGN PATENT DOCUMENTS

| JP | 2003-217890 A | | 7/2003 |
| JP | 2003-229289 A | | 8/2003 |
| JP | 2003-229296 A | | 8/2003 |
| JP | 2005-135754 A | | 5/2005 |
| JP | 2005-242089 A | | 9/2005 |
| JP | 2006-300706 A | | 11/2006 |
| JP | 2007-059281 A | | 3/2007 |
| JP | 2007-128776 A | | 5/2007 |
| JP | 2009-037160 A | | 2/2009 |
| JP | 2010-182430 A | | 8/2010 |
| JP | 2011-228317 A | | 11/2011 |
| JP | 2014102190 A | * | 6/2014 |

* cited by examiner

*Primary Examiner* — Sultan Chowdhury
*Assistant Examiner* — Danell L Owens
(74) *Attorney, Agent, or Firm* — Oliff PLC

(57) ABSTRACT

A projector according to an aspect of the invention includes a discharge lamp having a light emitting tube and configured to emit light, a light modulation device configured to modulate the light emitted from the discharge lamp in accordance with an image signal, a projection optical system configured to project the light modulated by the light modulation device, a first detection section configured to detect ultraviolet light out of the light emitted from the discharge lamp, and a control section configured to determine a deterioration state of the light emitting tube based on a light intensity of the ultraviolet light detected by the first detection section.

20 Claims, 10 Drawing Sheets

PROJECTOR AND METHOD OF CONTROLLING PROJECTOR

BACKGROUND

1. Technical Field

The present invention relates to a projector and a method of controlling a projector.

2. Related Art

For example, in JP-A-2007-59281, there is described a projector, which determines that the state of a discharge lamp is faulty in the case in which the lamp voltage is equal to or lower than a reference voltage.

As one of the factors for causing the illuminance of the discharge lamp to drop, there can be cited devitrification. Devitrification is a phenomenon that an inside wall of a light emitting tube of the discharge lamp becomes high in temperature to thereby be crystallized, and thus get clouded. Since the light transmittance drops in the devitrified part of the light emitting tube, as a result, the illuminance of the discharge lamp drops.

The devitrification occurs irrespective of the value of the lamp voltage. Therefore, it is difficult to detect that the devitrification has occurred by detecting only the value of the lamp voltage as in the projector described above. Therefore, the deterioration state of the discharge lamp cannot correctly be figured out, and thus the product life of the discharge lamp degrades in some cases.

SUMMARY

An advantage of some aspects of the invention is to provide a projector capable of enhancing the product life of the discharge lamp, and a method of controlling a projector capable of enhancing the product life of the discharge lamp.

A projector according to an aspect of the invention includes a discharge lamp having a light emitting tube and configured to emit light, a light modulation device configured to modulate the light emitted from the discharge lamp in accordance with an image signal, a projection optical system configured to project the light modulated by the light modulation device, a first detection section configured to detect ultraviolet light out of the light emitted from the discharge lamp, and a control section configured to determine a deterioration state of the light emitting tube based on a light intensity of the ultraviolet light detected by the first detection section.

According to the projector related to this aspect of the invention, since the deterioration state of the light emitting tube can be determined based on the light intensity of the ultraviolet light, it is easy to accurately figure out the deterioration state of the discharge lamp. Thus, it is possible to appropriately treat the discharge lamp having deteriorated. Therefore, according to the projector related to this aspect of the invention, the product life of the discharge lamp can be enhanced.

The projector related to the aspect of the invention may be configured such that the projector further includes a reflecting mirror configured to reflect a part of the light emitted from the discharge lamp toward a predetermined direction, the reflecting mirror transmits the ultraviolet light out of the light emitted from the discharge lamp, and the first detection section detects the ultraviolet light transmitted through the reflecting mirror.

According to this configuration, the light intensity of the ultraviolet light can be detected without decreasing the light intensity of the light emitted from the projector.

The projector related to the aspect of the invention may be configured such that the first detection section is located on a vertically upper side of the discharge lamp and the reflecting mirror.

According to this configuration, the deterioration state of the light emitting tube can more accurately be determined.

The projector related to the aspect of the invention may be configured such that the projector further includes a shield member disposed between the first detection section and the reflecting mirror, and configured to block light, and the shield member has an opening section located on a vertically upper side of the discharge lamp.

According to this configuration, the deterioration state of the light emitting tube can more accurately be determined.

The projector related to the aspect of the invention may be configured such that the projector further includes a reflecting mirror configured to reflect at least a part of the light emitted from the discharge lamp toward a predetermined direction, the reflecting mirror is attached to a first end portion of the light emitting tube, the first end portion being located on a direction side opposite to the predetermined direction, and the first detection section is located on the opposite direction side with respect to the first end portion.

According to this configuration, the light intensity of the ultraviolet light can be detected without decreasing the light intensity of the light emitted from the projector.

The projector related to the aspect of the invention may be configured such that the projector further includes a reflecting mirror configured to reflect at least a part of the light emitted from the discharge lamp toward a predetermined direction, and the first detection section detects the ultraviolet light out of the light reflected by the reflecting mirror.

According to this configuration, by disposing the first detection section on the light path of the optical system of the projector, the light intensity of the ultraviolet light can be detected by the first detection section. Therefore, it is difficult for the projector to grow in size due to the first detection section.

The projector related to the aspect of the invention may be configured such that the projector further includes an optical component configured to reflect the ultraviolet light out of the light reflected by the reflecting mirror, and the first detection section detects the ultraviolet light reflected by the optical component.

According to this configuration, by disposing the first detection section on the light path of the optical system of the projector, the light intensity of the ultraviolet light can be detected by the first detection section. Therefore, it is difficult for the projector to grow in size due to the first detection section.

The projector related to the aspect of the invention may be configured such that the projector further includes a filter disposed on a light path of the light entering the first detection section, and the filter transmits the ultraviolet light, and blocks at least a part of light other than the ultraviolet light.

According to this configuration, the detection accuracy of the ultraviolet light by the first detection section can be improved.

A projector according to another aspect of the invention includes a discharge lamp having a light emitting tube and configured to emit light, a light modulation device configured to modulate the light emitted from the discharge lamp in accordance with an image signal, a projection optical system configured to project the light modulated by the light modulation device, a second detection section configured to detect predetermined visible light out of the light emitted from the discharge lamp, and a control section configured to determine a deterioration state of the light emitting tube based on a light intensity of the predetermined visible light detected by the second detection section.

According to the projector related to this aspect of the invention, since the deterioration state of the light emitting tube can be determined based on the light intensity of the predetermined visible light, it is easy to accurately figure out the deterioration state of the discharge lamp. Thus, it is possible to appropriately treat the discharge lamp having deteriorated. Therefore, according to the projector related to this aspect of the invention, the product life of the discharge lamp can be enhanced.

The projector related to the aspect of the invention may be configured such that the predetermined visible light includes first visible light and second visible light different in wavelength from the first visible light, and the control section determines the deterioration state of the light emitting tube based on a ratio between a light intensity of the first visible light and a light intensity of the second visible light.

According to this configuration, even in the case in which the light intensity of the light emitted from the discharge lamp varies, it is easy to accurately determine the deterioration state of the light emitting tube.

The projector related to the aspect of the invention may be configured such that the first visible light is light in a short wavelength band, and the second visible light is light in a long wavelength band.

According to this configuration, the fact that the light emitting tube has deteriorated can promptly be determined. Further, it is easy to more accurately determine the degree of the deterioration of the light emitting tube.

The projector related to the aspect of the invention may be configured such that the predetermined visible light is light in a short wavelength band.

According to this configuration, it is easy to more accurately determine the deterioration state of the light emitting tube.

The projector related to the aspect of the invention may be configured such that the second detection section is located on a light path between the discharge lamp and the light modulation device.

According to this configuration, since the change in the ratio between the light intensity of the first visible light and the light intensity of the second visible light can more accurately be detected, the deterioration state of the light emitting tube can more accurately be detected.

The projector related to the aspect of the invention may be configured such that the projector further includes a reflecting mirror configured to reflect the light emitted from the discharge lamp toward a predetermined direction, and an optical component to which light reflected by the reflecting mirror is input, and the second detection section is located on a light path between the reflecting mirror and the optical component.

According to this configuration, by detecting the light intensity of a single predetermined visible light beam, it is easy to determine the deterioration state of the light emitting tube.

The projector related to the aspect of the invention may be configured such that the second detection section detects the predetermined visible light out of the light emitted from the projection optical system.

According to this configuration, it is possible to prevent the light intensity of the light emitted from the projection optical system from decreasing due to the second detection section.

The projector related to the aspect of the invention may be configured such that the control section determines the deterioration state of the light emitting tube based on a light intensity of the predetermined visible light and a deterioration state of the light modulation device.

According to this configuration, the deterioration state of the light emitting tube can more accurately determined.

The projector related to the aspect of the invention may be configured such that the control section determines the deterioration state of the light emitting tube based on a light intensity of the predetermined visible light and an inter-electrode voltage of the discharge lamp.

According to this configuration, the deterioration state of the light emitting tube can more accurately determined.

The projector related to the aspect of the invention may be configured such that the projector further includes a cooling device configured to cool the discharge lamp, and the control section controls the cooling device based on the deterioration state of the light emitting tube determined.

According to this configuration, since the cooling degree of the discharge lamp can appropriately be controlled in accordance with the deterioration state of the light emitting tube, the product life of the discharge lamp can be enhanced.

The projector related to the aspect of the invention may be configured such that the projector further includes a discharge lamp drive section configured to supply drive power to the discharge lamp, and the control section controls the discharge lamp drive section based on the deterioration state of the light emitting tube determined.

According to this configuration, since the drive of the discharge lamp by the discharge lamp drive section can appropriately be controlled in accordance with the deterioration state of the light emitting tube, the product life of the discharge lamp can be enhanced.

The projector related to the aspect of the invention may be configured such that the projector further includes an external output device configured to output a state signal representing the deterioration state of the light emitting tube to an outside, and the control section makes the external output device output the state signal based on the deterioration state of the light emitting tube determined.

According to this configuration, the deterioration state of the light emitting tube can be transferred to the user.

A method of controlling a projector according to another aspect of the invention, the projector including a discharge lamp having a light emitting tube and configured to emit light, and configured to modulate the light from the discharge lamp and project the modulated light, includes detecting ultraviolet light out of the light emitted from the discharge lamp, and determining a deterioration state of the light emitting tube based on a light intensity of the ultraviolet light detected.

According to the method of controlling a projector related to this aspect of the invention, the product life of the discharge lamp can be enhanced similarly to the aspects described above.

A method of controlling a projector according to another aspect of the invention, the projector including a discharge lamp having a light emitting tube and configured to emit light, and configured to modulate the light from the discharge lamp and project the modulated light, includes detecting predetermined visible light out of the light emitted from the discharge lamp, and determining a deterioration state of the light emitting tube based on a light intensity of the predetermined visible light detected.

According to the method of controlling a projector related to this aspect of the invention, the product life of the discharge lamp can be enhanced similarly to the aspects described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment of the invention will be described with reference to the accompanying drawings.

It should be noted that the scope of the invention is not limited to the embodiments hereinafter described, but can arbitrarily be modified within the technical idea or the technical concept of the invention. Further, in the following drawings, the actual structures and the structures of the drawings are made different from each other in scale size, number, and so on in some cases in order to make each constituent easy to understand.

First Embodiment

Figure 1:
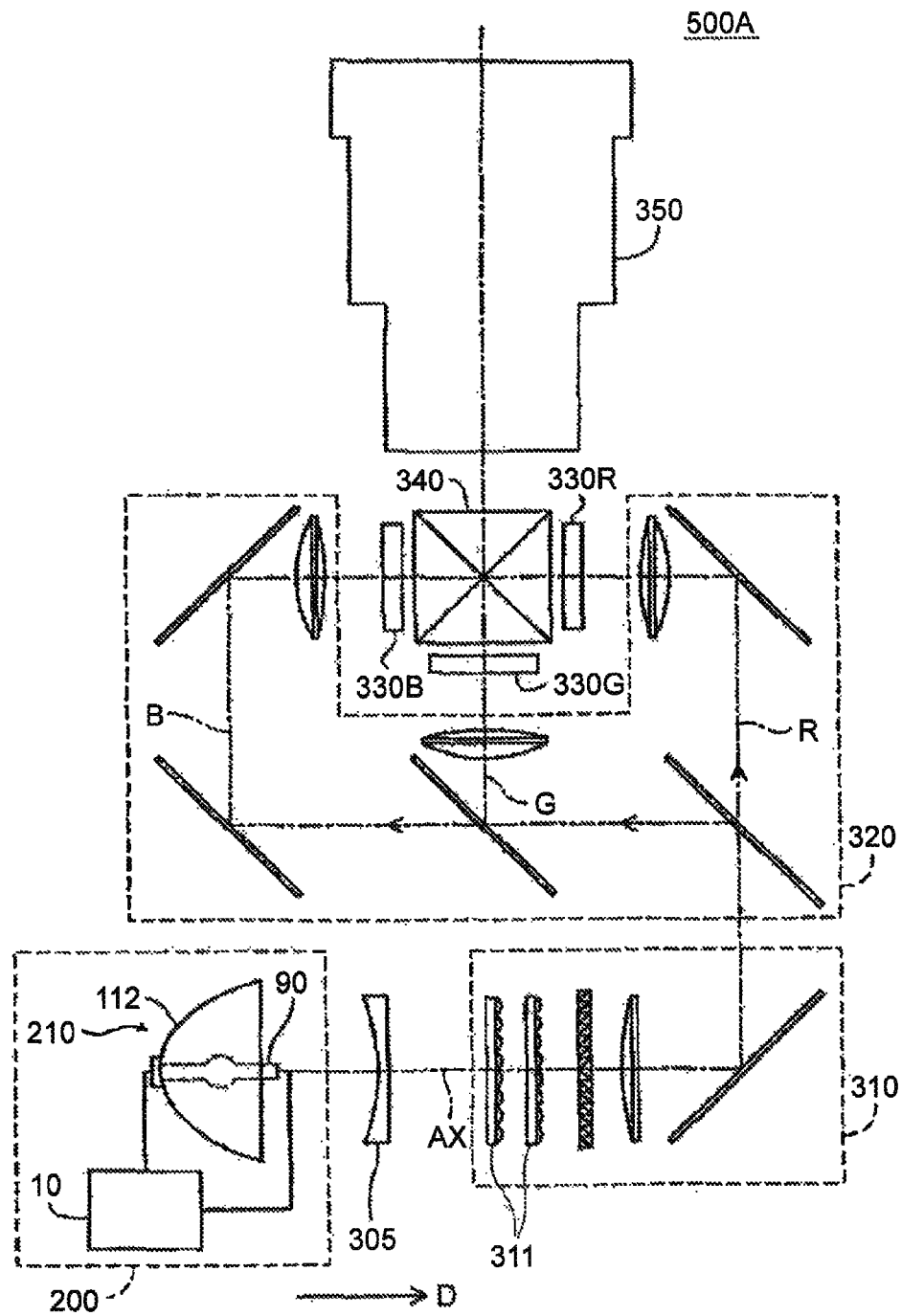
FIG. 1 is a schematic configuration diagram of a projector according to a first embodiment of the invention.

As shown in FIG. 1, the projector 500A according to the present embodiment is provided with a light source device 200, a collimating lens (an optical component) 305, an illumination optical system 310, a color separation optical system 320, three liquid crystal light valves (light modulation devices) 330R, 330G, and 330B, a cross dichroic prism 340, and a projection optical system (a projection optical device) 350.

The light emitted from the light source device 200 enters the collimating lens 305. In more detail, the light reflected by a main reflecting mirror 112 described later enters the collimating lens 305. The collimating lens 305 collimates the light from the light source device 200. The light having passed through the collimating lens 305 enters the illumination optical system 310.

The illumination optical system 310 adjusts the illuminance of the light emitted from the light source device 200 so as to be homogenized on the liquid crystal light valves 330R, 330G, and 330B. Further, the illumination optical system 310 uniforms the polarization direction of the light emitted from the light source device 200 to one direction. The reason therefor is to effectively utilize the light emitted from the light source device 200 in the liquid crystal light valves 330R, 330G, and 330B. The illumination optical system 310 includes, for example, two multi-lens arrays (optical components) 311.

The light adjusted in the illuminance and the polarization direction enters the color separation optical system 320. The color separation optical system 320 separates the incident light into three colored light beams, namely a red light beam R, a green light beam G, and a blue light beam B. The liquid crystal light valves 330R, 330G, and 330B associated with the respective colored light beams modulate the three colored light beams, respectively, in accordance with an image signal. The liquid crystal light valves 330R, 330G, and 330B have liquid crystal panels 560R, 560G, and 560B described later, and polarization plates (not shown), respectively. The polarization plates are disposed on the light incident side and the light exit side of each of the liquid crystal panels 560R, 560G, and 560B.

The cross dichroic prism 340 combines the three colored light beams thus modulated with each other. The composite light enters the projection optical system 350. The projection optical system 350 projects the incident light on a screen 700 (see FIG. 4). Thus, a picture is displayed on the screen 700. It should be noted that as a configuration of each of the collimating lens 305, the illumination optical system 310, the color separation optical system 320, the cross dichroic prism 340, and the projection optical system 350, known configurations can be adopted.

Figure 2:
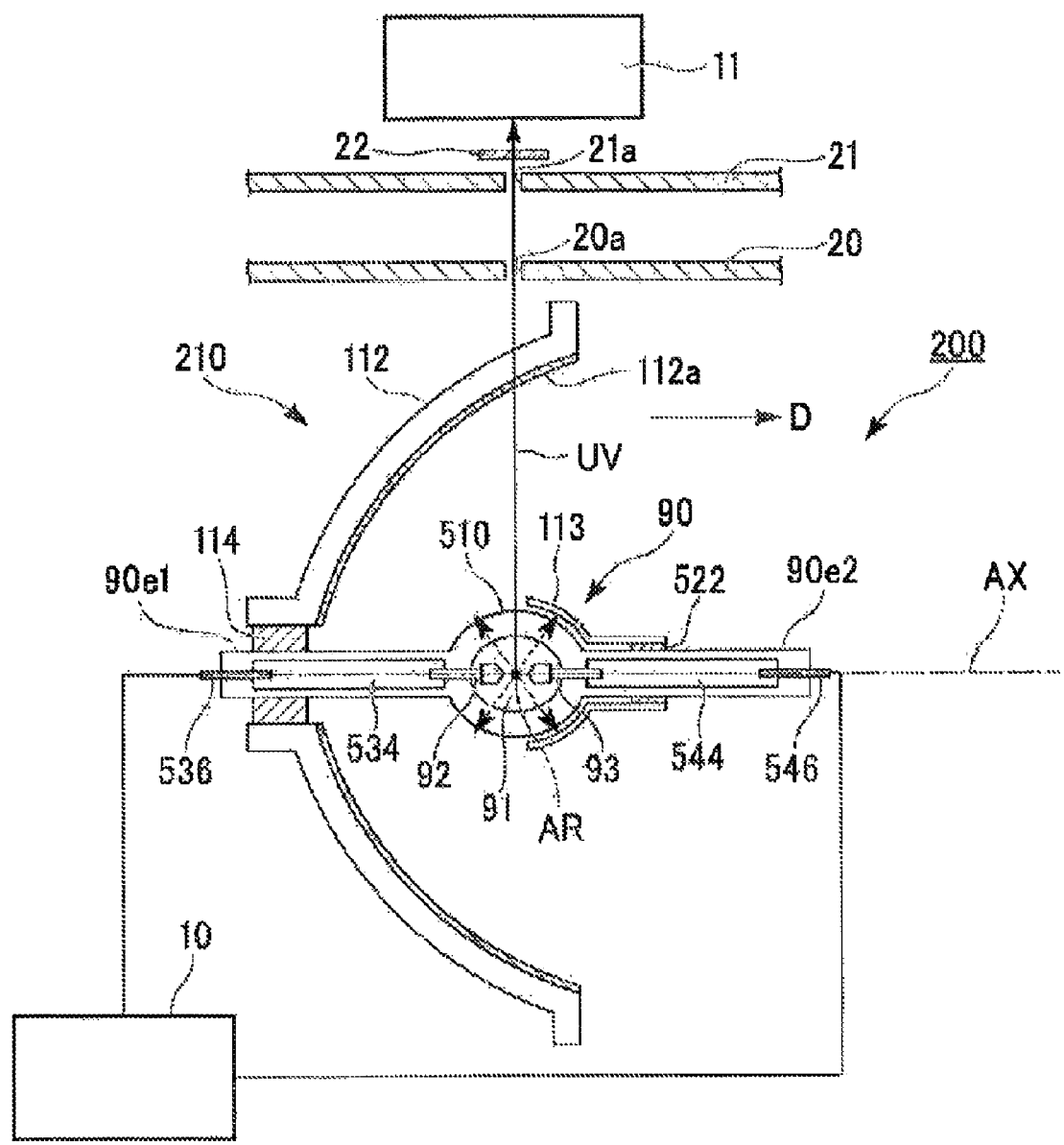
FIG. 2 is a cross-sectional view showing a configuration of a light source device of the first embodiment.

FIG. 2 is a cross-sectional view showing a configuration of the light source device 200. FIG. 2 shows a cross-sectional view of the light source unit 210. In FIG. 2, an irradiation direction (a predetermined direction) of the light emitted from the discharge lamp 90 is indicated by the arrow D. The irradiation direction is parallel to an optical axis AX of the discharge lamp 90. It should be noted that in the present specification, the irradiation direction includes irradiation directions of the whole of the light emitted from the discharge lamp 90. Further, in the following description, a direction (−D direction) opposite to the irradiation direction (+D direction) is simply called an opposite direction.

As shown in FIG. 2, the light source device 200 is provided with a discharge lamp lighting device (discharge lamp drive section) 10 and a light source unit 210. The light source unit 210 includes the discharge lamp 90, the main reflecting mirror (a reflecting mirror) 112, and a sub-reflecting mirror 113.

The discharge lamp lighting device 10 generates a high voltage between electrodes of the discharge lamp 90 at the time of startup to cause insulation breakdown to thereby form a discharge path. Thereafter, the discharge lamp lighting device 10 supplies a drive current I for the discharge lamp 90 to keep the discharge. Thus, the discharge lamp lighting device 10 lights the discharge lamp 90.

The discharge lamp 90 emits light. The discharge lamp 90 has a light emitting tube 510, a first electrode 92, and a second electrode 93.

The light emitting tube 510 has a rod-like shape extending along the irradiation direction (the +D direction). An end portion on the opposite direction (the −D direction) side of the light emitting tube 510 is defined as a first end portion 90e1. An end portion on the irradiation direction (the +D direction) side of the light emitting tube 510 is defined as a second end portion 90e2. The material of the light emitting tube 510 is a light transmissive material such as quartz glass.

A central portion of the light emitting tube 510 bulges to have a spherical shape, and a discharge space 91 is provided inside the central portion. In the discharge space 91, there is encapsulated a gas as a discharge medium including mercury, a noble gas, a metallic halide, and so on.

In the discharge space 91, there are projected the tips of the first electrode 92 and the second electrode 93. The first electrode 92 is disposed on the first end portion 90e1 side (the −D direction side) of the discharge space 91. The second electrode 93 is disposed on the second end portion 90e2 side (the +D direction side) of the discharge space 91. Each of the first electrode 92 and the second electrode 93 has a rod-like shape extending along the optical axis AX. In the discharge space 91, there are disposed electrode tip portions of the first electrode 92 and the second electrode 93 so as to be opposed to each other with a predetermined distance. The material of the first electrode 92 and the second electrode 93 is metal such as tungsten.

Figure 3:
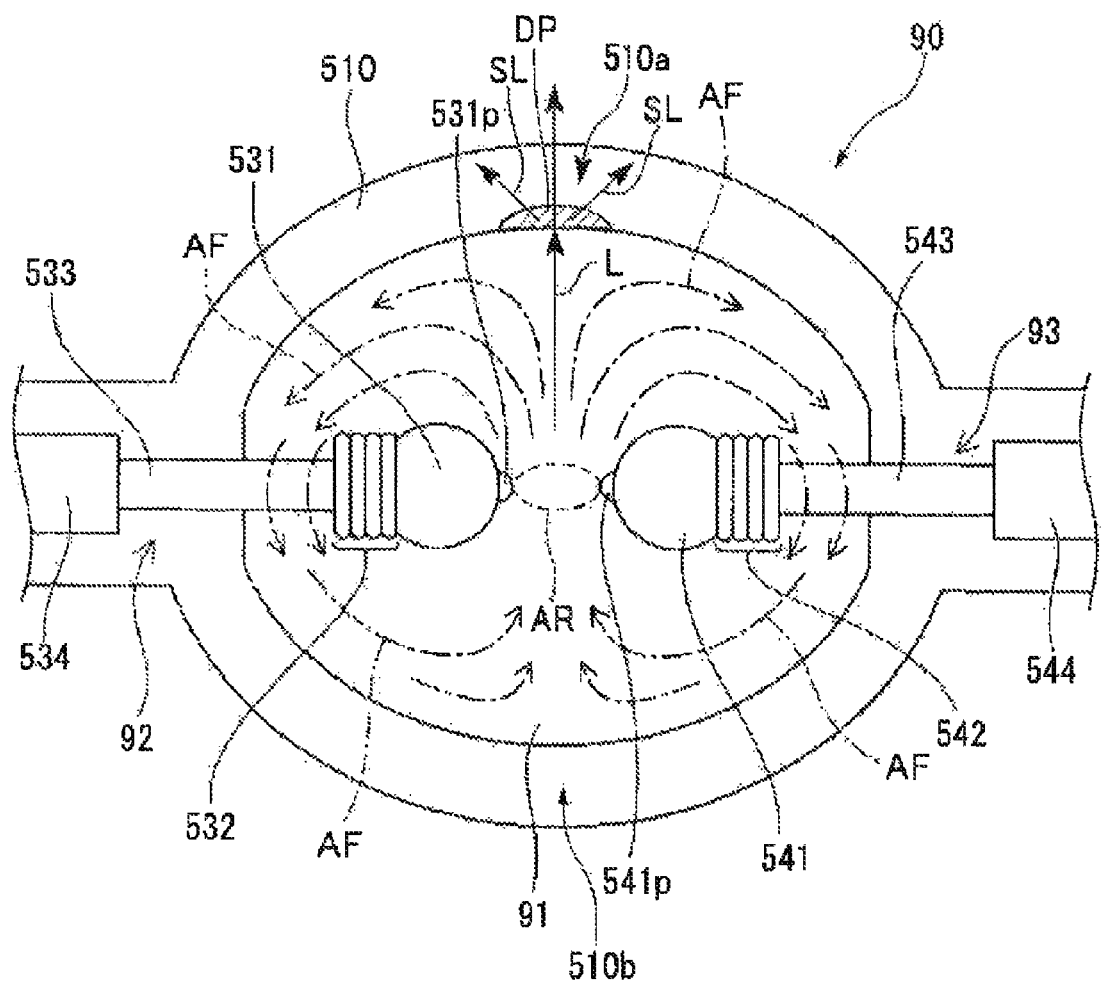
FIG. 3 is a partial enlarged cross-sectional view of a discharge lamp of the first embodiment.

FIG. 3 is an enlarged cross-sectional view showing a part of the discharge lamp 90.

As shown in FIG. 3, the first electrode 92 has a core rod 533, a coil portion 532, a main body portion 531, and a projection 531p. The first electrode 92 is formed in a stage prior to the encapsulation into the light emitting tube 510 by winding a wire rod made of an electrode material (e.g., tungsten) around the core rod 533 to form the coil portion 532, and then heating to melt the coil portion 532 thus formed. Thus, the main body portion 531 with a high thermal capacity and the projection 531p forming a place where the arc AR occurs are formed on the tip side of the first electrode 92.

The second electrode 93 has a core rod 543, a coil portion 542, a main body portion 541, and a projection 541p. The second electrode 93 is formed in a similar manner to the case of the first electrode 92.

As shown in FIG. 2, the first end portion 90e1 of the light emitting tube 510 is provided with a first terminal 536. The first terminal 536 and the first electrode 92 are electrically connected to each other with a conductive member 534 penetrating the inside of the discharge lamp 90. Similarly, the second end portion 90e2 of the light emitting tube 510 is provided with a second terminal 546. The second terminal 546 and the second electrode 93 are electrically connected to each other with a conductive member 544 penetrating the inside of the discharge lamp 90. The material of the first terminal 536 and the second terminal 546 is metal such as tungsten. As the material of the conductive members 534, 544, there is used, for example, molybdenum foil.

The first terminal 536 and the second terminal 546 are connected to the discharge lamp lighting device 10. The discharge lamp lighting device 10 supplies the first terminal 536 and the second terminal 546 with a drive current for driving the discharge lamp 90. As a result, arc discharge is caused between the first electrode 92 and the second electrode 93. The light (discharge light) generated by the arc discharge is emitted from the discharge position in all directions as indicated by the dashed arrows.

As shown in FIG. 3, when lighting the discharge lamp 90, the gas encapsulated in the discharge space 91 is heated due to the generation of the arc AR, and convects inside the discharge space 91. In detail, since the arc AR and an area in the vicinity of the arc AR become extremely high in temperature, convection flows AF (indicated by the dashed line arrows in FIG. 3) flowing vertically upward from the arc AR are formed in the discharge space 91. The convection flows AF collide against the inside wall of the light emitting tube 510 to move along the inside wall of the light emitting tube 510, and then fall while being cooled by passing through the core rods 533, 543 of the first electrode 92 and the second electrode 93 and so on.

The convection flows AF thus fallen further fall along the inside wall of the light emitting tube 510, and then collide each other on the lower side in the vertical direction of the arc AR to rise so as to return to the arc AR located above. By the convection flows AF moving along the inside wall of the light emitting tube 510, the light emitting tube 510 is heated.

Here, the convection flows AF is highest in temperature on the vertically upper side of the arc AR, and is lowest in temperature on the vertically lower side of the arc AR. Therefore, the top portion 510a of the light emitting tube 510 having contact with the convection flows AF on the vertically upper side of the arc AR becomes the hottest part highest in temperature of the light emitting tube 510. Further, the bottom portion 510b of the light emitting tube 510 having contact with the convection flows AF on the vertically lower side of the arc AR becomes the coolest part lowest in temperature of the light emitting tube 510.

As shown in FIG. 2, the main reflecting mirror 112 is attached to the first end portion 90e1 of the light emitting tube 510 with a fixation member 114. The main reflecting mirror 112 has a reflecting film 112a disposed on a surface (a reflecting surface) located on the discharge lamp 90 side. The reflecting film 112a reflects a visible light beam. The reflecting film 112a transmits ultraviolet light. In other words, the main reflecting mirror 112 transmits the ultraviolet light out of the light emitted from the discharge lamp 90. Further, the main reflecting mirror 112 reflects a part of the light (the discharge light) emitted from the discharge lamp 90 toward the irradiation direction (the +D direction). Out of the light emitted from the discharge lamp 90, the light proceeding toward the opposite direction (the −D direction) is reflected by the main reflecting mirror 112 toward the irradiation direction (the +D direction).

It should be noted that in the present specification, the ultraviolet light includes the light having the wavelength of, for example, roughly no smaller than 10 nm and no greater than 400 nm.

The shape of the reflecting surface of the main reflecting mirror 112 is not particularly limited within a range in which the discharge light can be reflected toward the irradiation direction (the +D direction), but can also be, for example, a spheroidal shape or a paraboloidal shape. In the case of, for example, adopting the paraboloidal shape as the shape of the reflecting surface of the main reflecting mirror 112, the main reflecting mirror 112 is capable of converting the discharge light into the light roughly parallel to the optical axis AX. Thus, the collimating lens 305 can be eliminated.

The sub-reflecting mirror 113 is fixed to the second end portion 90e2 side (the +D direction side) of the light emitting tube 510 with a fixation member 522. A surface (a reflecting surface) on the discharge lamp 90 side of the sub-reflecting mirror 113 has a spherical shape surrounding a part of the discharge space 91 located on the second end portion 90e2 side (the +D direction side). Out of the discharge light, the light proceeding toward the opposite side (the +D direction side) to the side where the main reflecting mirror 112 is disposed is reflected by the sub-reflecting mirror 113 toward the main reflecting mirror 112. Thus, the efficiency of the light emitted from the discharge space 91 can be improved.

The material of the fixation members 114, 522 is not particularly limited within a range in which the material is a heat-resistant material tolerable to the heat generated by the discharge lamp 90, and is, for example, an inorganic adhesive.

A circuit configuration of the projector 500A will hereinafter be described.

Figure 4:
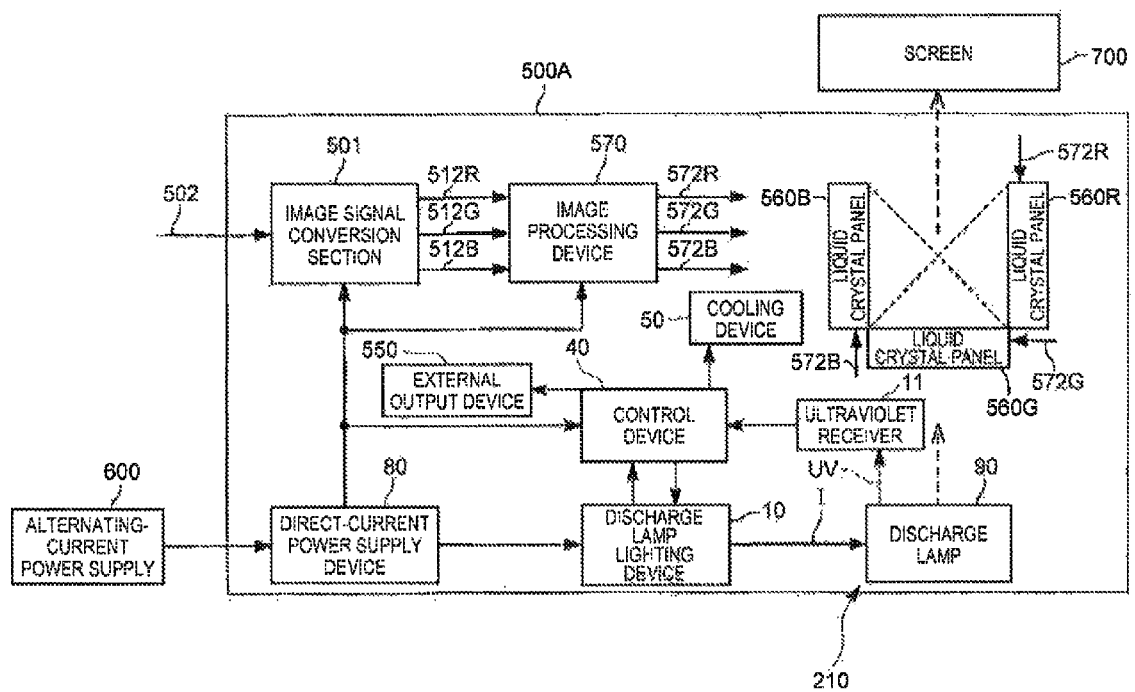
FIG. 4 is a block diagram showing a variety of constituents of the projector according to the first embodiment.

FIG. 4 is a diagram showing an example of the circuit configuration of the projector 500A according to the present embodiment. As shown in FIG. 4, the projector 500A is provided with an image signal conversion section 501, an image processing device 570, a direct-current power supply device 80, liquid crystal panels 560R, 560G, and 560B, an ultraviolet receiver (a first detection section) 11, a cooling device 50, an external output device 550, and a control device (a control section) 40 besides the constituents shown in FIG. 1.

The image signal conversion section 501 converts an image signal 502 (e.g., a luminance/color-difference signal or an analog RGB signal) input from the outside into a digital RGB signal of a predetermined word length to thereby generate image signals 512R, 512G, and 512B, and then supplies the image signals 512R, 512G, and 512B to the image processing device 570.

The image processing device 570 performs image processing on each of the three image signals 512R, 512G, and 512B. The image processing device 570 supplies the liquid crystal panels 560R, 560G, and 560B with drive signals 572R, 572G, and 572B for driving the liquid crystal panels 560R, 560G, and 560B, respectively.

The direct-current power supply device 80 converts the alternating-current voltage supplied from an external alternating-current power supply 600 into a constant direct-current voltage. The direct-current power supply device 80 supplies the direct-current voltage to the image signal conversion section 501 and the image processing device 570 located on the secondary side of a transformer (not shown, but included in the direct-current power supply device 80) and the discharge lamp lighting device 10 located on the primary side of the transformer.

The liquid crystal panels 560R, 560G, and 560B are provided respectively to the liquid crystal light valves 330R, 330G, and 330B described above. The liquid crystal panels 560R, 560G, and 560B modulate the transmittance (luminance) of the colored light beams entering the liquid crystal panels 560R, 560G, and 560B via the optical system described above based on the drive signals 572R, 572G, and 572B, respectively.

The ultraviolet receiver 11 is located on the vertically upper side of the discharge lamp 90 and the main reflecting mirror 112 as shown in FIG. 2. The ultraviolet receiver 11 detects the ultraviolet light UV out of the light emitted from the discharge lamp 90. In the present embodiment, the ultraviolet receiver 11 detects the ultraviolet light UV transmitted through the main reflecting mirror 112 out of the light emitted from the discharge lamp 90. As shown in FIG. 4, the ultraviolet receiver 11 transmits the information of the light intensity of the ultraviolet light UV thus detected to the control device 40. The configuration of the ultraviolet receiver 11 is not particularly limited providing the ultraviolet light UV can be detected.

As shown in FIG. 2, between the ultraviolet receiver 11 and the main reflecting mirror 112, there are disposed shield members 20, 21 and a filter 22. The shield members 20, 21 are arranged side by side in the vertical direction. The shield members 20, 21 block the light.

The shield members 20, 21 are respectively provided with apertures (opening sections) 20a, 21a. The apertures 20a, 21a are both located on the vertically upper side of the arc AR located in the discharge space 91. In other words, the shield members 20, 21 respectively have the apertures 20a, 21a located on the vertically upper side of the discharge lamp 90.

The filter 22 is located between the shield members 20, 21 and the ultraviolet receiver 11. In more detail, the filter 22 is located on the vertically upper side of the aperture 21a of the shield member 21. The filter 22 transmits the ultraviolet light UV, and blocks at least a part of the light other than the ultraviolet light UV.

The light emitted toward the vertically upper side of the shield member 21 via the apertures 20a, 21a enters the filter 22. In the present embodiment, the light entering the filter 22 is the light having been transmitted through the main reflecting mirror 112. For example, the reflecting film 112a of the main reflecting mirror 112 transmits an infrared ray together with the ultraviolet light UV. Therefore, the filter 22 blocks, for example, the infrared ray. The ultraviolet light UV having been transmitted through the filter 22 enters the ultraviolet receiver 11. Specifically, the filter 22 is disposed on the light path of the light entering the ultraviolet receiver 11.

The cooling device 50 shown in FIG. 4 is formed of, for example, a fan. The fan of the cooling device 50 is formed of, for example, a sirocco fan. The fan of the cooling device 50 suctions the air in the inside or the outside of a housing of the projector 500A to blow the light source unit 210 with the air. The cooling device 50 is capable of cooling the discharge lamp 90 of the light source unit 210.

The external output device 550 is capable of outputting a state signal representing a deterioration state of the light emitting tube 510 to the outside. The state signal representing the deterioration state includes, for example, a signal representing a degree of the denitrification caused in the light emitting tube 510, and a signal representing the time for replacement of the discharge lamp 90 based on the deterioration of the light emitting tube 510. The state signal can be a signal using, for example, blinking of light, an image or a sound. The configuration of the external output device 550 is not particularly limited providing the state signal can be output to the outside. The external output device 550 can be, for example, an indicator lamp or a display disposed on a surface of the housing of the projector 500A, or a speaker for outputting a sound.

The control device 40 controls a variety of operations of the projector 500A from the start of lighting to the extinction. The control device 40 controls the discharge lamp lighting device 10 in accordance with the drive current waveform of the drive current I. The control device 40 outputs a lighting command and an extinction command to the discharge lamp lighting device 10. The control device 40 receives lighting information of the discharge lamp 90 from the discharge lamp lighting device 10. Further, the control device 40 controls the cooling device 50 and the external output device 550. The details will be described later.

To the control device 40, the information of the light intensity of the ultraviolet light UV having been detected is input from the ultraviolet receiver 11. The control device 40 determines the degree of the denitrification DP caused in, for example, the light emitting tube 510 based on the information of the light intensity of the ultraviolet light UV input. Specifically, the control device 40 determines the deterioration state of the light emitting tube 510 based on the light intensity of the ultraviolet light UV having been detected by the ultraviolet receiver 11. It should be noted that as the deterioration factor of the discharge lamp 90, there can be cited the deterioration of the light emitting tube 510, the deterioration of the first electrode 92 or the second electrode 93, and so on. However, one of the advantages of the invention is to determine the deterioration state of the light emitting tube 510.

Then, the determination of the deterioration state of the light emitting tube 510 by the control device 40 will be described.

As shown in FIG. 3, if the devitrification DP occurs in the light emitting tube 510, the light passing through the devitrification DP is scattered. Therefore, the light L proceeding straight and passing through the light emitting tube 510 decreases. Since the scattered light SL thus scattered changes in the proceeding angle, most of the scattered light SL fails to enter the optical component such as the collimating lens 305 shown in FIG. 1. Thus, in the case in which the devitrification DP occurs in the light emitting tube 510, the illuminance of the light emitted from the projector 500A drops.

Figure 5:
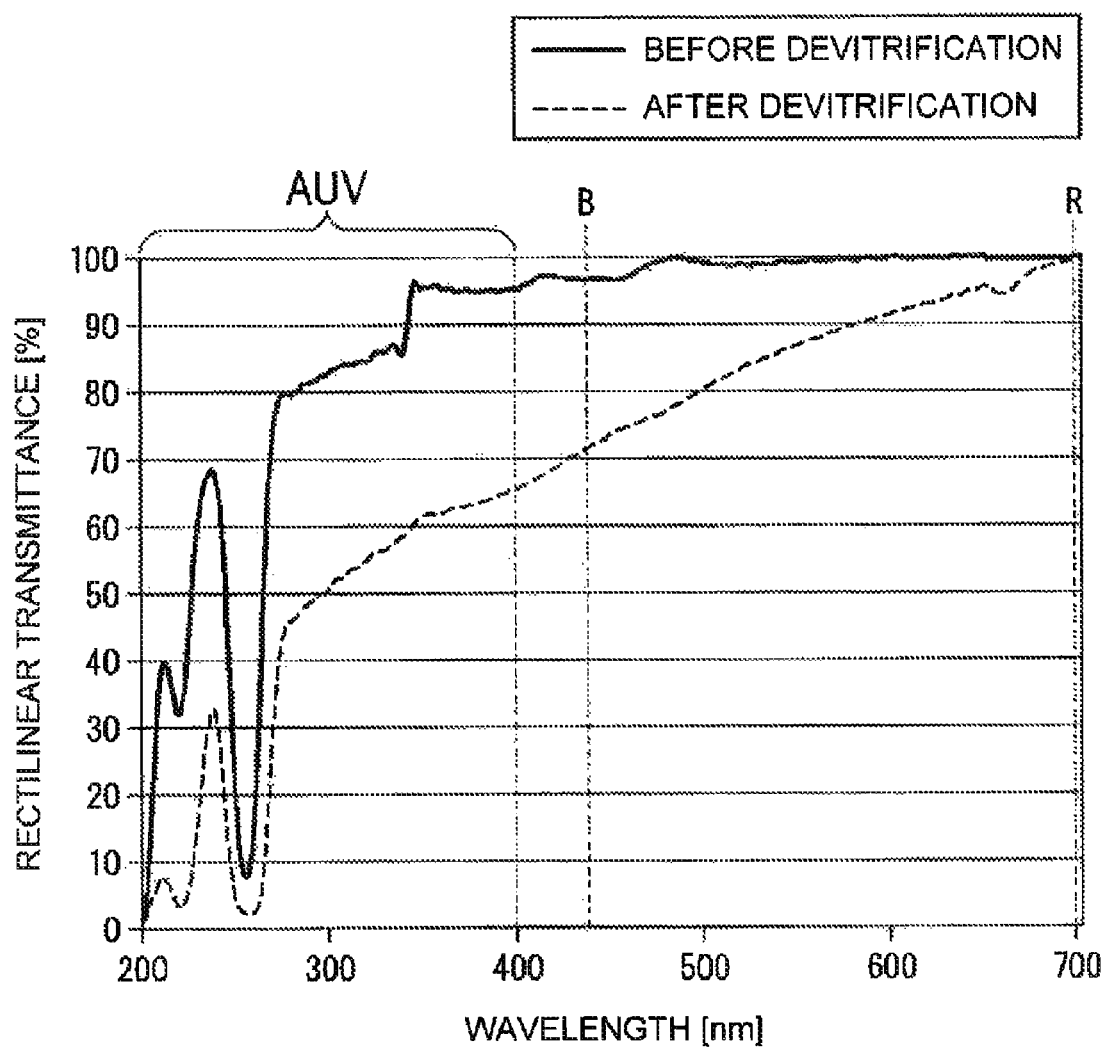
FIG. 5 is a graph showing the rectilinear transmittance of a light emitting tube by the wavelength of the light.

Here, the degree of scattering caused by the devitrification DP differs by the wavelength of the incident light. FIG. 5 shows an example of a graph showing the rectilinear transmittance of the light passing through the light emitting tube 510 by the wavelength. In FIG. 5, the horizontal axis represents the wavelength [nm], and the vertical axis represents the rectilinear transmittance [%]. FIG. 5 shows each of the case of the light emitting tube in which the devitrification does not occur, and the case of the light emitting tube in which the devitrification occurs.

As shown in FIG. 5, the shorter the wavelength of the light is, the lower the rectilinear transmittance becomes after the devitrification has occurred. In other words, the shorter the wavelength of the light is, the higher the degree of the scattering of the light due to the devitrification DP becomes, and the larger the difference in rectilinear transmittance between before and after the occurrence of the devitrification becomes. In particular, in the ultraviolet region AUV with the wavelength equal to or shorter than 400 nm, the difference in rectilinear transmittance between before and after the occurrence of the devitrification becomes.

Therefore, by detecting the change in light intensity of the light in the ultraviolet region AUV, namely the ultraviolet light UV, out of the light proceeding straight through the light emitting tube 510, the degree of occurrence of the devitrification DP in the light emitting tube 510 can accurately be detected. In such a manner as described above, the control device 40 determines the deterioration state of the light emitting tube 510.

In the present embodiment, the ultraviolet receiver 11 is located on the vertically upper side of the discharge lamp 90 and the main reflecting mirror 112. Therefore, the ultraviolet light UV, which proceeds straight vertically upward to be transmitted through the light emitting tube 510, enters the ultraviolet receiver 11. Further, the more the devitrification occurs, the more the light intensity of the ultraviolet light UV, which proceeds straight vertically upward to be transmitted through the light emitting tube 510, decreases due to the scattering of the light. Therefore, in the present embodiment, in the case in which the light intensity of the ultraviolet light UV detected by the ultraviolet receiver 11 has decreased, the control device 40 determines that the devitrification DP has occurred in the light emitting tube 510. Further, the control device 40 determines the degree of the occurrence of the devitrification DP in accordance with the decrement of the light intensity of the ultraviolet light UV.

Then, the control by the control device 40 based on the deterioration state of the light emitting tube 510 thus determined will be described.

In the present embodiment, the control device 40 controls the cooling device 50 based on the deterioration state of the light emitting tube 510 thus determined. Specifically, in the case in which the control device 40 determines that, for example, the devitrification DP has occurred in the light emitting tube 510, the control device 40 increases the degree of cooling of the discharge lamp 90 by the cooling device 50 in accordance with the degree of the devitrification DP.

In the present embodiment, the control device 40 controls the discharge lamp lighting device 10 based on the deterioration state of the light emitting tube 510 thus determined. Specifically, in the case in which the control device 40 determines that, for example, the devitrification DP has occurred in the light emitting tube 510, the control device 40 sets a drive current waveform high in ratio of high frequency wave as the drive current waveform of the drive current I supplied by the discharge lamp lighting device 10 to the discharge lamp 90. The discharge lamp lighting device 10 supplies the discharge lamp 90 with the drive current I having the frequency higher than, for example, 1 kHz.

In the present embodiment, the control device 40 makes the external output device 550 output the state signal representing the deterioration state based on the deterioration state of the light emitting tube 510 thus determined. Specifically, in the case in which the control device 40 has determined that, for example, the devitrification DP has occurred in the light emitting tube 510, and it is necessary to replace the discharge lamp 90, the control device 40 notifies the user of the fact that it is necessary to replace the discharge lamp 90 using the external output device 550.

The configuration described hereinabove can also be expressed as a method of controlling the projector 500A. Specifically, the method of controlling the projector 500A according to the present embodiment is a method of controlling a projector provided with the discharge lamp 90 including the light emitting tube 510 to emit the light, the liquid crystal light valves 330R, 330G, and 330B for modulating the light emitted from the discharge lamp 90 in accordance with the image signal, and the projection optical system 350 for projecting the light modulated by the liquid crystal light valves 330R, 330G, and 330B, and is characterized by including the steps of detecting the ultraviolet light UV out of the light emitted from the discharge lamp 90, and determining the deterioration state of the light emitting tube 510 based on the light intensity of the ultraviolet light UV thus detected.

According to the present embodiment, the control device 40 determines the deterioration state of the light emitting tube 510 based on the light intensity of the ultraviolet light UV. Therefore, the control device 40 can more accurately figure out the deterioration state of the discharge lamp 90. Thus, it is possible to appropriately treat the discharge lamp 90 having deteriorated, and thus it is possible to enhance the product life of the discharge lamp 90.

Further, when the devitrification DP occurs in the light emitting tube 510, the temperature in the inside of the light emitting tube 510, namely in the discharge space 91, rises. It is conceivable that the reason thereof is that the inside of the light emitting tube 510 is irradiated with the light scattered due to the devitrification DP. If the internal temperature of the light emitting tube 510 rises to a high temperature, there is a possibility that the light emitting tube 510 might be damaged.

In contrast, according to the present embodiment, the control device 40 controls the cooling device 50 based on the deterioration state of the light emitting tube 510 thus determined. Therefore, in the case in which it has been detected that the devitrification DP has occurred, by increasing the degree of cooling of the discharge lamp 90, it is possible to inhibit the inside of the light emitting tube 510 from becoming high in temperature. Therefore, according to the present embodiment, it is possible to inhibit the light emitting tube 510 from becoming high in temperature to be damaged.

Further, according to the present embodiment, the control device 40 controls the discharge lamp lighting device 10 based on the deterioration state of the light emitting tube 510 thus determined. Therefore, in the case in which the devitrification DP has occurred, the drive current waveform high in ratio of the high-frequency wave can be set as the drive current waveform of the drive current I supplied by the discharge lamp lighting device 10 to the discharge lamp 90. Thus, it is possible to inhibit the devitrification DP from further advancing.

Further, according to the present embodiment, the control device 40 makes the external output device 550 output the state signal representing the deterioration state of the light emitting tube 510 based on the deterioration state of the light emitting tube 510 thus determined. Therefore, in the case in which the denitrification DP has occurred in the light emitting tube 510 to cause the necessity of replacing the discharge lamp 90, it is possible to inform the user of the projector 500A of the fact that it is necessary to replace the discharge lamp 90. Thus, it is possible for the user to replace the discharge lamp 90 at an appropriate timing.

Further, according to the present embodiment, the ultraviolet receiver 11 detects the ultraviolet light UV transmitted through the main reflecting mirror 112. Therefore, there is no chance of reducing the light intensity of the light reflected by the main reflecting mirror 112, namely the light emitted from the projector 500A via the optical components such as the collimating lens 305. Further, since the visible light in the light emitted from the discharge lamp 90 is reflected by the reflecting film 112a of the main reflecting mirror 112, it is difficult for the light other than the ultraviolet light UV to enter the ultraviolet receiver 11. Therefore, the detection accuracy of the ultraviolet light UV by the ultraviolet receiver 11 can be improved.

Further, as described above, in the light emitting tube 510, the top portion 510a of the light emitting tube 510 becomes the hottest part the highest in temperature. Therefore, as shown in FIG. 3, it is easiest for the devitrification DP to occur in the top portion 510a of the light emitting tube 510.

In contrast, according to the present embodiment, the ultraviolet receiver 11 is located on the vertically upper side of the discharge lamp 90 and the main reflecting mirror 112. Therefore, the ultraviolet light UV, which is transmitted through the top portion 510a of the light emitting tube 510, enters the ultraviolet receiver 11. Thus, it is possible for the control device 40 to determine whether or not the devitrification DP has occurred in the top portion 510a of the light emitting tube 510 where it is easiest for the devitrification DP to occur. Therefore, according to the present embodiment, it is possible to promptly and appropriately detect the fact that the devitrification DP has occurred.

Further, for example, the light transmitted through the main reflecting mirror 112 includes the ultraviolet light UV scattered due to, for example, the devitrification DP. In the case in which the ultraviolet light UV having been scattered due to the devitrification DP enters the ultraviolet receiver 11, it is difficult to accurately detect the light intensity of the ultraviolet light UV proceeding straight through the light emitting tube 510. Therefore, there is a possibility that the occurrence of the devitrification DP cannot accurately be determined.

In contrast, according to the present embodiment, between the ultraviolet receiver 11 and the main reflecting mirror 112, there are disposed the shield members 20, 21 respectively having the apertures 20a, 21a. Thus, the ultraviolet light UV proceeding straight through the light emitting tube 510 enters the ultraviolet receiver 11 via the apertures 20a, 21a, and the ultraviolet light UV scattered due to the devitrification DP is blocked by the shield members 20, 21. Therefore, according to the present embodiment, it is easy to accurately detect the light intensity of the ultraviolet light UV proceeding straight through the light emitting tube 510, and as a result, it is easy to accurately determine the occurrence of the devitrification DP.

Further, according to the present embodiment, on the light path of the light entering the ultraviolet receiver 11, there is disposed the filter 22. Therefore, even in the case in which light other than the ultraviolet light UV, for example, an infrared ray, is included in the light having been transmitted through the reflecting film 112a of the main reflecting mirror 112, the infrared ray can be blocked. Thus, it is possible to inhibit the light other than the ultraviolet light UV from entering the ultraviolet receiver 11, and thus, the detection accuracy of the ultraviolet light UV by the ultraviolet receiver 11 can be improved.

It should be noted that in the present embodiment, it is also possible to adopt the following configurations and methods.

In the above description, there is adopted the configuration in which the control device 40 controls the cooling device 50, the discharge lamp lighting device 10, and the external output device 550 based on the deterioration state of the light emitting tube 510 having been determined, but the embodiment is not limited to this configuration. In the present embodiment, it is also possible to adopt a configuration in which the control device 40 controls either one or two of the cooling device 50, the discharge lamp lighting device 10, and the external output device 550 based on the deterioration state of the light emitting tube 510 having been determined.

Figure 6:
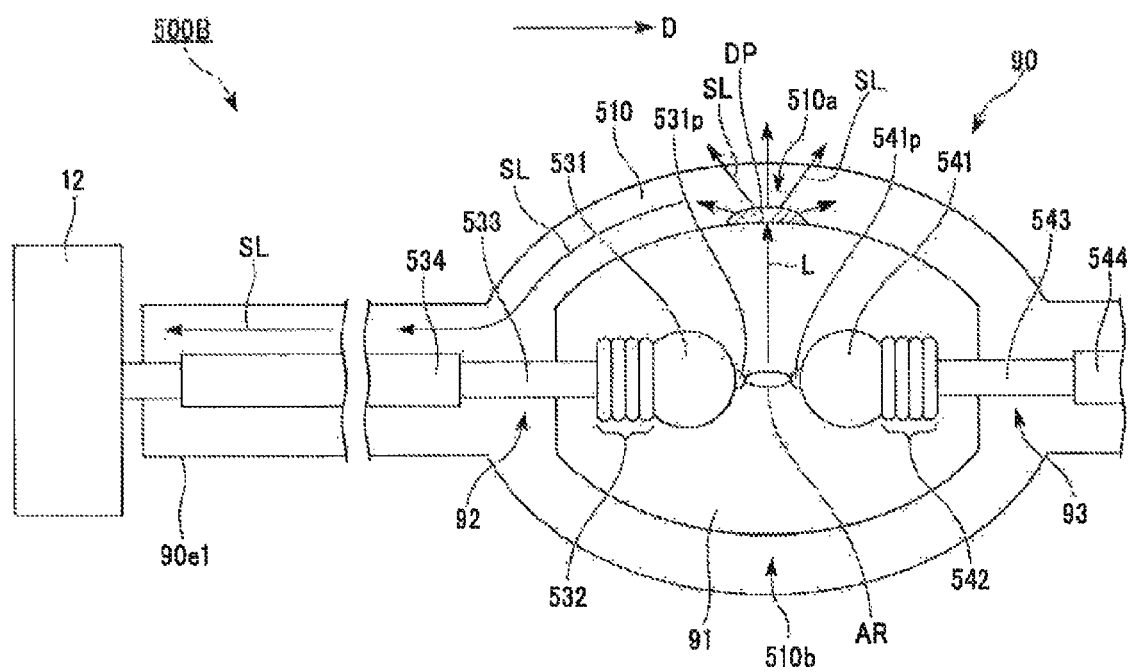
FIG. 6 is a diagram showing a part of a projector as another example of the first embodiment.
Figure 7:
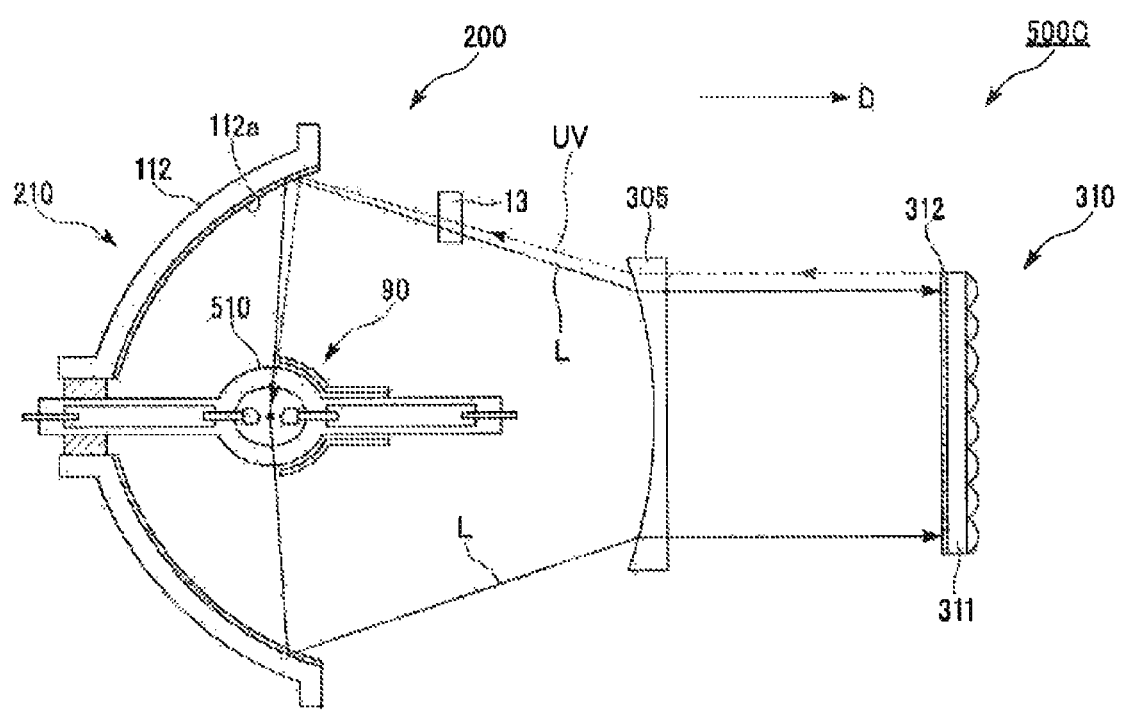
FIG. 7 is a diagram showing a part of the projector as another example of the first embodiment.

Further, in the present embodiment, it is also possible to adopt such a configuration as shown in FIG. 6 or FIG. 7.

FIG. 6 is a diagram showing a part of a projector 500B as another example of the present embodiment.

As shown in FIG. 6, the projector 500B is provided with an ultraviolet receiver 12. The ultraviolet receiver 12 is located on the opposite direction (the −D direction) side of the first end portion 90e1 of the light emitting tube 510.

For example, a part of the scattered light SL scattered due to the denitrification DP reaches the first end portion 90e1 of the light emitting tube 510 through the inside of the wall of the light emitting tube 510. The scattered light SL having reached the first end portion 90e1 is emitted to the outside of the light emitting tube 510 to enter the ultraviolet receiver 12.

As described above, the light short in wavelength, namely the ultraviolet light UV, for example, is apt to be scattered due to the devitrification DP. Therefore, most of the scattered light SL entering the ultraviolet receiver 12 from the first end portion 90e1 is the ultraviolet light UV. The ultraviolet receiver 12 detects the ultraviolet light UV in the scattered light SL.

The higher the degree of the occurrence of the devitrification DP is, the higher the light intensity of the scattered light SL having reached the first end portion 90e1, namely the ultraviolet light UV, becomes. Therefore, in this configuration, in the case in which the light intensity of the ultraviolet light UV detected by the ultraviolet receiver 12 has increased, the control device 40 determines that the devitrification DP has occurred in the light emitting tube 510.

According to this configuration, the product life of the discharge lamp 9 can be enhanced in a similar manner to the case of the projector 500A described above.

It should be noted that in this configuration, it is also possible for the main reflecting mirror 112 to have a configuration of reflecting all of the light emitted from the discharge lamp 90 toward the irradiation direction.

FIG. 7 is a diagram showing a part of a projector 500C as another example of the present embodiment.

As shown in FIG. 7, the projector 500C is provided with an ultraviolet receiver 13. The ultraviolet receiver 13 is disposed, for example, on the light path between the main reflecting mirror 112 and the collimating lens 305.

Apart of the light L, which is reflected by the main reflecting mirror 112 and then enters the collimating lens 305, enters the ultraviolet receiver 13. The ultraviolet receiver 13 detects the ultraviolet light UV in the light L thus entered. In other words, the ultraviolet receiver 13 detects the ultraviolet light UV in the light L reflected by the main reflecting mirror 112.

As described above, since the light scattered due to the devitrification DP deviates from the light path, if the devitrification DP occurs, the light intensity of the ultraviolet light UV included in the light L decreases. Therefore, in this configuration, in the case in which the light intensity of the ultraviolet light UV detected by the ultraviolet receiver 13 has decreased, the control device 40 determines that the devitrification DP has occurred in the light emitting tube 510.

According to this configuration, the ultraviolet receiver 13 is disposed on the light path of the optical system of the projector 500C. In other words, since the ultraviolet receiver 13 can be disposed in a gap between the optical components disposed as the light path, it is difficult for the projector 500C to increase in size due to the ultraviolet receiver 13.

It should be noted that in this configuration, it is also possible for the ultraviolet receiver 13 to detect the ultraviolet light UV reflected by the illumination optical system 310. The light L having been collimated by the collimating lens 305 enters the multi-lens array 311 of the illumination optical system 310. The multi-lens array 311 has an ultraviolet reflecting film 312 disposed on a surface on the opposite direction (the −D direction) side. The ultraviolet reflecting film 312 reflects the ultraviolet light UV having entered the ultraviolet reflecting film 312. Thus, the ultraviolet light UV out of the light L having entered the multi-lens array 311 is reflected. In other words, the multi-lens array 311 reflects the ultraviolet light UV out of the light L reflected by the main reflecting mirror 112.

The ultraviolet light UV having been reflected by the multi-lens array 311 proceeds in the light path similar to the light path of the light L entering the multi-lens array 311 in the opposite direction. In this configuration, it is also possible to detect this ultraviolet light UV using the ultraviolet receiver 13. In other words, it is also possible for the ultraviolet receiver 13 to detect the ultraviolet light UV reflected by the multi-lens array 311.

Further, in this configuration, it is also possible to adopt a configuration in which an optical component other than the multi-lens array 311 reflects the ultraviolet light UV.

Further, in this configuration, the ultraviolet receiver 13 can be disposed at any places providing the ultraviolet light UV in the light L reflected by the main reflecting mirror 112 can be detected.

Further, in this configuration, the light intensity of the ultraviolet light UV returning to the inside of the light emitting tube 510 can be detected instead of detecting the light intensity of the ultraviolet light UV using the ultraviolet receiver 13. The ultraviolet light UV having been reflected by the ultraviolet reflecting film 312 of the multi-lens array 311 returns to the inside of the light emitting tube 510. If the light intensity of the ultraviolet light UV reflected by the ultraviolet reflecting film 312 decreases due to the occurrence of the denitrification DP, the light intensity of the ultraviolet light UV returning to the inside of the light emitting tube 510 also decreases. Therefore, by observing the light intensity of the ultraviolet light UV returning to the inside of the light emitting tube 510, the occurrence of the denitrification DP can be determined. It should be noted that in this case, the equipment for observing the light intensity of the ultraviolet light UV corresponds to the first detection section.

It should be noted that in the configuration shown in FIG. 7, the reflecting film 112a of the main reflecting mirror 112 reflects a part or all of the ultraviolet light UV. In the case of the configuration of reflecting all of the ultraviolet light UV, it is also possible for the main reflecting mirror 112 to have a configuration of reflecting all of the light emitted from the discharge lamp 90 toward the irradiation direction. Further, also in the configuration shown in FIG. 2, it is possible for the reflecting film 112a of the main reflecting mirror 112 to have a configuration of reflecting a part of the ultraviolet light UV.

Further, in the present embodiment, it is also possible to provide two or more ultraviolet receivers. In this case, it is possible for the control device 40 to determine the deterioration state of the light emitting tube 510 based on the information, which can be obtained from the two or more ultraviolet receivers. Thus, the control device 40 can more accurately determine the deterioration state of the light emitting tube 510.

Second Embodiment

A second embodiment is different from the first embodiment in the point that the deterioration state of the light emitting tube 510 is determined based on the light intensity of visible light. It should be noted that in the following description, the constituents substantially the same as those of the first embodiment are arbitrarily denoted by the same reference symbols and so on to thereby omit the description thereof in some cases.

Figure 8:
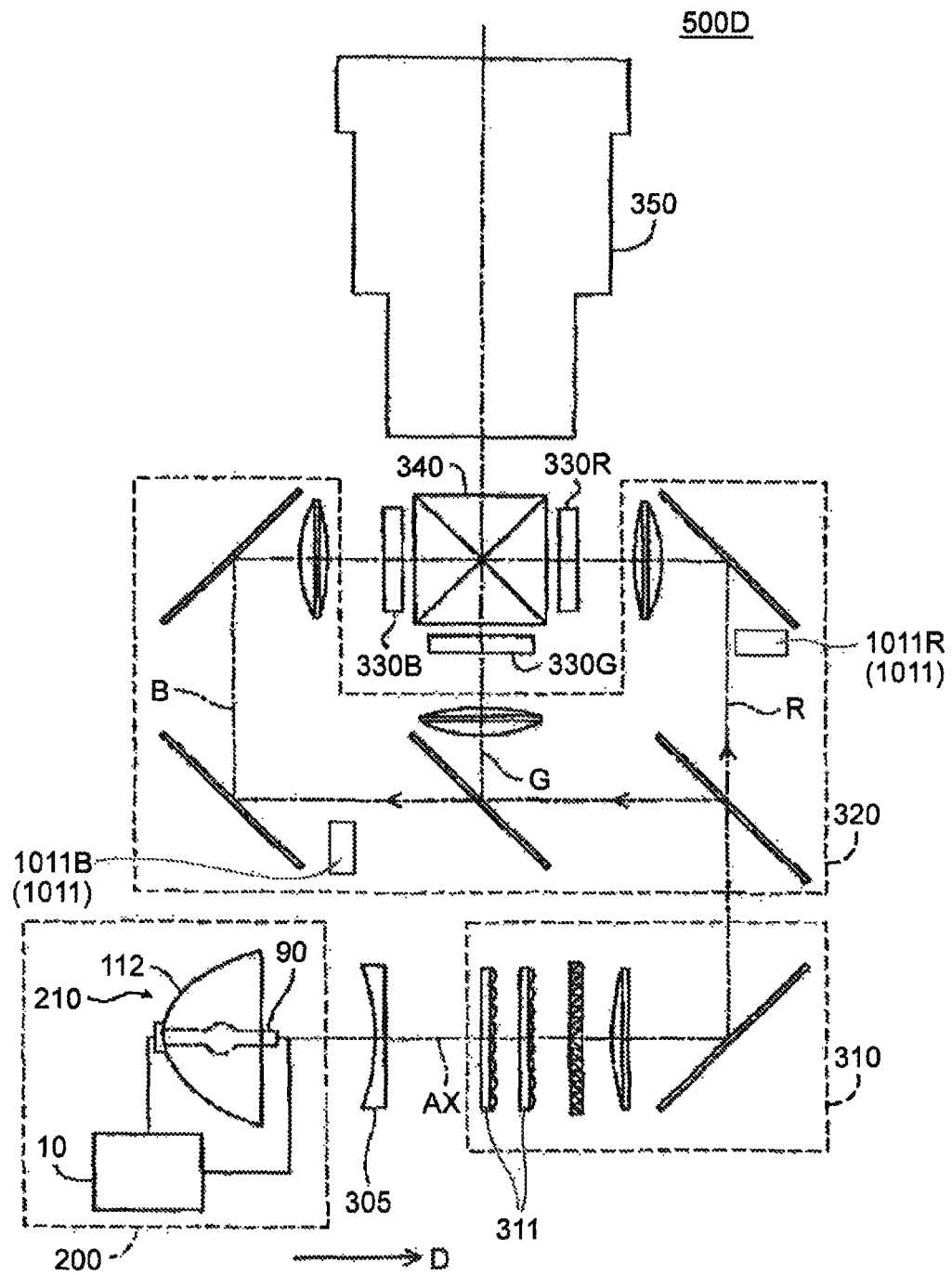
FIG. 8 is a schematic configuration diagram of a projector according to a second embodiment of the invention.

As shown in FIG. 8, a projector 500D according to the present embodiment is provided with the light source device 200, the collimating lens 305, the illumination optical system 310, the color separation optical system. 320, the three liquid crystal light valves 330R, 330G, and 330B, the cross dichroic prism 340, and the projection optical system 350.

A circuit configuration of the projector 500D will hereinafter be described.

Figure 9:
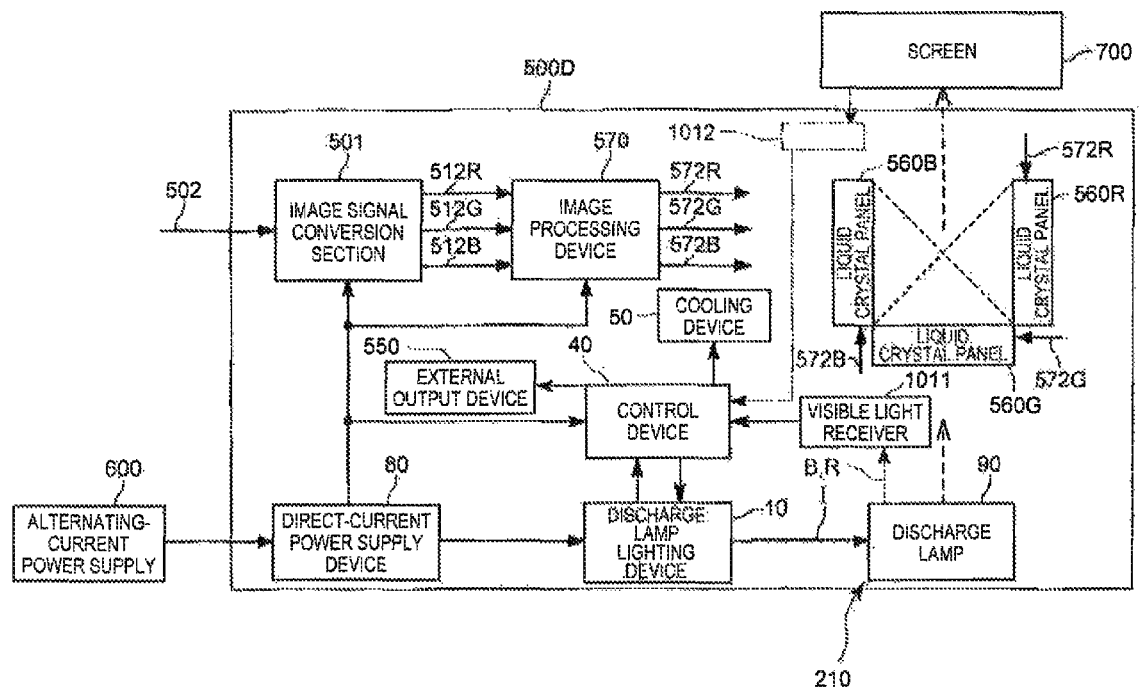
FIG. 9 is a block diagram showing a variety of constituents of the projector according to the second embodiment.

FIG. 9 is a diagram showing an example of the circuit configuration of the projector 500D according to the present embodiment. As shown in FIG. 9, the projector 500D is provided with the image signal conversion section 501, the image processing device 570, the direct-current power supply device 80, the liquid crystal panels 560R, 560G, and 560B, a visible light receiver (a second detection section) 1011, the cooling device 50, the external output device 550, and the control device 40 besides the constituents shown in FIG. 8.

The visible light receiver 1011 detects predetermined visible light beams out of the light emitted from the discharge lamp 90. In the present embodiment, the visible light beams detected by the visible light receiver 1011 are, for example, the blue light beam (a first visible light beam) B as the light in the short wavelength band, and the red light beam (a second visible light beam) R as the light in the long wavelength band. In other words, in the present embodiment, the predetermined visible light beams include the blue light beam B, and the red light beam R different in wavelength from the blue light beam B. The visible light receiver 1011 transmits the information of the light intensity of the blue light beam B and the light intensity of the red light beam R having been detected to the control device 40.

It should be noted that in the present specification, the blue light beam B includes the light having the wavelength of, for example, no smaller than 430 nm and no greater than 490 nm. Further, in the present specification, the red light beam R includes the light having the wavelength of, for example, no smaller than 620 nm and no greater than 810 nm.

Further, in the following description, the information of the light intensity of the blue light beam B and the light intensity of the red light beam R is simply referred to as information of the light intensity of the visible light in some cases.

As shown in FIG. 8, in the present embodiment, the visible light receiver 1011 includes two receivers, namely a blue light receiver (the second detection section) 1011B, and a red light receiver (the second detection section) 1011R. In the present embodiment, the blue light receiver 1011B and the red light receiver 1011R are disposed on the light path between the discharge lamp 90 and the liquid crystal light valves 330R, 330G, and 330B.

In more detail, the blue light receiver 1011B and the red light receiver 1011R are disposed on the light path between the optical components constituting the color separation optical system 320. The blue light receiver 1011B is disposed on the light path of the blue light beam B separated by the color separation optical system 320. The red light receiver 1011R is disposed on the light path of the red light beam R separated by the color separation optical system 320.

The configuration of the blue light receiver 1011B is not particularly limited providing the blue light beam B can be received. The configuration of the red light receiver 1011R is not particularly limited providing the red light beam R can be received.

In the present embodiment, to the control device 40, the information of the light intensity of the visible light having been detected is input from the visible light receiver 1011. The control device 40 determines the degree of the devitrification DP caused in, for example, the light emitting tube 510 based on the information of the light intensity of the visible light input. Specifically, the control device 40 determines the deterioration state of the light emitting tube 510 based on the light intensity of the predetermined visible light detected by the visible light receiver 1011.

Then, the determination of the deterioration state of the light emitting tube 510 by the control device 40 in the present embodiment will be described. According to FIG. 5, it is confirmed that the rectilinear transmittance of the red light beam R is roughly the same between before and after the occurrence of the devitrification, while the rectilinear transmittance of the blue light beam B drops by about 25% after the occurrence of the devitrification compared to that before the occurrence of the devitrification.

It should be noted that in FIG. 5, the blue light beam B is shown as the light with the wavelength of 435.8 nm as an example. The red light beam R is shown as the light with the wavelength of 700 nm as an example. These are the values of the wavelengths of the primary colors in the RGB color system determined by the International Commission on Illumination (CIE).

As described above, since the blue light beam B is easier to be scattered due to the devitrification DP compared to the red light beam. R, if the devitrification DP occurs, the proportion of the light intensity of the blue light beam B included in the light of the discharge lamp 90 to the light intensity of the red light beam R included in the light of the discharge lamp 90 decreases after passing through the light emitting tube 510 compared to that before passing through the light emitting tube 510. Thus, by detecting the ratio between the light intensity of the blue light beam B included in the light having been emitted from the discharge lamp 90, namely the light having been transmitted through the light emitting tube 510, and the light intensity of the red light beam R included therein, the occurrence of the devitrification DP in the light emitting tube 510 can be detected.

Specifically, in the case in which, for example, the light intensity of the blue light beam B included in the light emitted from the arc AR and the light intensity of the red light beam R included therein are equal to each other, the control device 40 determines that the devitrification DP has occurred in the light emitting tube 510 if the light intensity of the blue light beam B included in the light having proceeded straight through the light emitting tube 510 is lower than the light intensity of the red light beam R included therein. Further, the control device 40 determines the degree of the occurrence of the devitrification DP in accordance with the level of the proportion of the light intensity of the blue light beam B to the light intensity of the red light beam R.

In such a manner as described above, the control device 40 of the present embodiment determines the deterioration state of the light emitting tube 510 based on the ratio between the light intensity of the blue light beam B and the light intensity of the red light beam R.

The configuration described hereinabove can also be expressed as a method of controlling the projector 500D. Specifically, the method of controlling the projector 500D according to the present embodiment is a method of controlling a projector provided with the discharge lamp 90 including the light emitting tube 510 to emit the light, the liquid crystal light valves 330R, 330G, and 330B for modulating the light emitted from the discharge lamp 90 in accordance with the image signal, and the projection optical system 350 for projecting the light modulated by the liquid crystal light valves 330R, 330G, and 330B, and is characterized by including the steps of detecting the predetermined visible light out of the light emitted from the discharge lamp 90, and determining the deterioration state of the light emitting tube 510 based on the light intensity of the predetermined visible light thus detected.

According to the present embodiment, the control device 40 determines the deterioration state of the light emitting tube 510 based on the light intensity of the predetermined visible light. Therefore, the control device 40 can more accurately figure out the deterioration state of the discharge lamp 90. Thus, it is possible to appropriately treat the discharge lamp 90 having deteriorated, and thus it is possible to enhance the product life of the discharge lamp 90.

Further, in the case in which, for example, the light intensity of the light emitted from the arc AR varies, it is difficult to determine whether or not the light intensity of the visible light to be detected has decreased due to the denitrification DP only by detecting the light intensity of a single visible light beam.

In contrast, according to the present embodiment, the control device 40 determines the deterioration state of the light emitting tube 510 based on the ratio in light intensity between two visible light beams different in wavelength. Therefore, even in the case in which the light intensity of the light emitted from the arc AR has varied, the deterioration state of the light emitting tube 510 can be determined by detecting the variation in the ratio of the light intensity between the two different visible light beams.

Further, according to the present embodiment, the control device 40 determines the deterioration state of the light emitting tube 510 based on the ratio between the light intensity of the blue light beam B as the light in the short wavelength band and the light intensity of the red light beam R as the light in the long wavelength band. As shown in FIG. 5, the variation in the rectilinear transmittance between before and after the occurrence of the devitrification DP is significantly different between the blue light beam B and the red light beam R. Therefore, when the devitrification DP has occurred, the value of the ratio between the light intensity of the blue light beam B thus detected and the light intensity of the red light beam R thus detected can be made large. Thus, it is possible to promptly detect the fact that the devitrification DP has occurred in the light emitting tube 510, and at the same time, the degree of the devitrification DP can more accurately be detected.

Further, according to the present embodiment, the blue light receiver 1011B and the red light receiver 1011R are disposed on the light path between the discharge lamp 90 and the liquid crystal light valves 330R, 330G, and 330B. Therefore, it is possible to detect the light intensity of each of the colored light beams, which have not yet been modulated by the liquid crystal light valves 330R, 330G, and 330B. Thus, it is easy to detect the change in the ratio between the light intensity of the blue light beam B and the light intensity of the red light beam R due to the devitrification DP. Therefore, according to the present embodiment, the deterioration state of the light emitting tube 510 can more accurately be determined.

It should be noted that in the present embodiment, it is also possible to adopt the following configurations and methods.

In the present embodiment, the visible light receiver can also be formed of an imaging device (the second detection section) 1012 indicated by dashed-two dotted lines in FIG. 9. The imaging device 1012 is, for example, a CCD (charge-coupled device) image sensor.

In this configuration, the light projected from the projection optical system 350 on the screen 700 is reflected by the surface of the screen 700, and then enters the imaging device 1012. The imaging device 1012 detects the blue light beam B and the red light beam R included in the light having entered the imaging device 1012. In other words, the imaging device 1012 detects the predetermined visible light out of the light emitted from the projection optical system 350.

In this configuration, the control device 40 provides a determination period, in which the deterioration state of the light emitting tube 510 is determined based on the light intensity of the predetermined visible light detected by the imaging device 1012, for example, immediately after lighting the projector 500D. In the determination period, the control device 40 controls the liquid crystal light valves 330R, 330G, and 330B so that the proportion of the light intensity of the blue light beam B included in the light emitted from the projection optical system 350 and the proportion of the light intensity of the red light beam R included therein become equal to the proportion of the light intensity of the blue light beam B included in the light not having entered the liquid crystal light valves 330R, 330G, and 330B and the proportion of the light intensity of the red light beam R included therein, respectively.

In this configuration, the control device 40 determines the deterioration state of the light emitting tube 510 based on, for example, the light intensity of the predetermined visible light and the deterioration state of the liquid crystal light valves 330R, 330G, and 330B.

In the case in which, for example, the liquid crystal light valves 330R, 330G, and 330B have been deteriorated, an error occurs in the modulation degree of the light emitted from the projection optical system 350. In such a case, since the light intensity of the blue light beam B or the light intensity of the red light beam R varies as much as the error in the modulation degree, it is difficult to accurately detect the change in the ratio between the light intensity of the blue light beam B and the light intensity of the red light beam R due to the denitrification DP in some cases. Thus, it is difficult for the control device 40 to accurately determine the deterioration state of the light emitting tube 510 in some cases.

In contrast, according to this configuration, the control device 40 determines the deterioration state of the light emitting tube 510 based on the deterioration state of the liquid crystal light valves 330R, 330G, and 330B. Therefore, the light intensity of the blue light beam B and the light intensity of the red light beam R detected by the imaging device 1012 can be corrected in accordance with the error in the degree of the modulation by the liquid crystal light valves 330R, 330G, and 330B. Thus, it is easy to accurately determine the deterioration state of the light emitting tube 510.

Further, according to this configuration, since there is no chance for the imaging device 1012 to block the light path in the projector 500D, there is no chance for the light intensity of the light emitted from the projection optical system 350 to decrease due to the imaging device 1012.

It should be noted that in this configuration, it is also possible for the control device 40 to determine the deterioration state of the light emitting tube 510 in the case in which the proportion of the light intensity of the blue light beam B included in the light emitted from the projection optical system 350 and the proportion of the light intensity of the red light beam R included therein are different from the proportion of the light intensity of the blue light beam B included in the light not having entered the liquid crystal light valves 330R, 330G, and 330B and the proportion of the light intensity of the red light beam R included therein, respectively.

In this case, the control device 40 figures out the proportion of the light intensity of the blue light beam B included in the light, which has been modulated by, for example, the liquid crystal light valves 330R, 330G, and 330B and then emitted from the projection optical system 350 and the proportion of the light intensity of the red light beam R included therein based on the image signals 512R, 512G, and 512B. Then, the control device 40 determines the deterioration state of the light emitting tube 510 using the proportion of the light intensity of the blue light beam B and the proportion of the light intensity of the red light beam figured out based on the image signals 512R, 512G, and 512B, and the information of the light intensity of the visible light obtained by the imaging device 1012. Thus, whatever modulation is performed by the liquid crystal light valves 330R, 330G, and 330B on the light emitted from the projection optical system 350, the deterioration state of the light emitting tube 510 can be determined.

Figure 10:
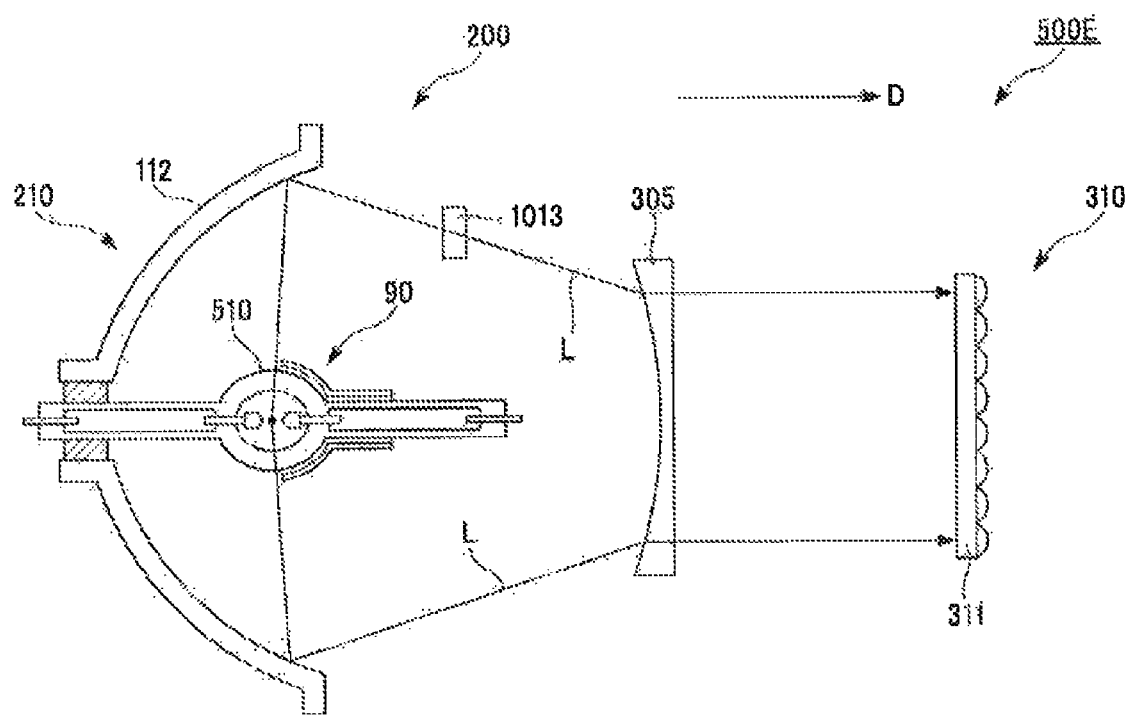
FIG. 10 is a diagram showing a part of a projector as another example of the second embodiment.

Further, in the present embodiment, it is also possible to adopt such a configuration as shown in FIG. 10. FIG. 10 is a diagram showing a part of a projector 500E as another example of the present embodiment.

As shown in FIG. 10, the projector 500E is provided with a visible light receiver (the second detection section) 1013. The visible light receiver 1013 is disposed, for example, on the light path between the main reflecting mirror 112 and the collimating lens 305.

A part of the light L, which is reflected by the main reflecting mirror 112 and then enters the collimating lens 305, enters the visible light receiver 1013. The visible light receiver 1013 detects predetermined visible light. The predetermined visible light detected by the visible light receiver 1013 is, for example, the blue light beam B as the light in the short wavelength band.

As described above, since the light scattered due to the devitrification DP deviates from the light path, if the devitrification DP occurs, the light intensity of the blue light beam B included in the light L decreases. Therefore, in this configuration, in the case in which the light intensity of the blue light beam B detected by the visible light receiver 1013 has decreased, the control device 40 determines that the devitrification DP has occurred in the light emitting tube 510.

For example, if the discharge lamp 90 has deteriorated and the inter-electrode distance of the discharge lamp 90 has been enlarged, the emission volume of the arc AR increases, and the angle of the light L emitted from the discharge lamp 90 is widened. Therefore, a part of the light L deviates from the light path due to the vignetting by the optical components disposed on the light path as the light L proceeds on the light path from the discharge lamp 90 to the projection optical system 350. As a result, the illuminance of the light emitted from the projection optical system 350 decreases. In this case, it is difficult to determine whether the decrease in the light intensity of the blue light beam B included in the light L passing through the light path in the projector 500E is caused by the devitrification DP, or caused by the growth of the inter-electrode distance.

In contrast, according to this configuration, the visible light receiver 1013 is disposed between the main reflecting mirror 112 and the collimating lens 305 to which the light L reflected by the main reflecting mirror 112 is input. Even in the case in which the angle of the light L widens due to the growth of the inter-electrode distance, the light intensity of the light L deviating from the light path is relatively low at a position relatively close to the discharge lamp 90. Therefore, in the case in which the light intensity of the blue light beam. B has dramatically decreased according to the visible light receiver 1013, the control device 40 can determine that the devitrification DP has occurred in the light emitting tube 510.

As described above, according to this configuration, by detecting the light intensity of the light with a single wavelength, the deterioration state of the light emitting tube 510 can be determined. Therefore, the number of the visible light receivers 1013 to be disposed can be set to one to thereby simplify the configuration of the projector 500E. Further, since the number of components of the projector 500E can be reduced, the manufacturing cost can be reduced.

It should be noted that in the case in which a single visible light receiver 1013 is disposed alone as in this configuration, it is also possible for the control device 40 to determine the deterioration state of the light emitting tube 510 based on the light intensity of predetermined visible light and the inter-electrode voltage of the discharge lamp 90. According to this configuration, since the inter-electrode distance can be detected based on the inter-electrode voltage, the light intensity decreases due to the growth of the inter-electrode distance can be obtained. Therefore, whatever position the visible light receiver 1013 is disposed at, it is possible to determine whether the decrease in the light intensity of the blue light beam B is caused by the denitrification DP or caused by the growth of the inter-electrode distance. As a result, the deterioration state of the light emitting tube 510 can be determined.

It should be noted that in this configuration, in the case in which, for example, the collimating lens 305 is not provided, the optical component to which the light L reflected by the main reflecting mirror 112 is input is, for example, the multi-lens array 311.

Further, although in the above description, the deterioration state of the light emitting tube 510 is determined by detecting the light with a single wavelength or the light having two wavelengths, the present embodiment is not limited to these configurations. In the present embodiment, it is also possible to detect light having three or more wavelengths to determine the deterioration state of the light emitting tube 510.

Further, in the present embodiment, the wavelength band of the light to be detected is not limited to the short wavelength band and the long wavelength band, but can also be, for example, a medium wavelength band. The light in the medium wavelength band is, for example, the green light beam G. Further, in the present embodiment, the wavelength of the visible light detected by the visible light receiver 1011 is not particularly limited.

Further, in the present embodiment, the visible light receivers 1011, 1013 and the imaging device 1012 described above can also be disposed at positions deviating from the light path. In this case, the visible light receivers 1011, 1013, and the imaging device 1012 each detect the light leaked from the light path.

It should be noted that although in each of the embodiments described above, an example of the case in which the invention is applied to the transmissive projector is described, the invention can also be applied to reflective projectors. Here, "transmissive" denotes that the liquid crystal light valve including the liquid crystal panel and so on is a type of transmitting the light. Further, "reflective" denotes that the liquid crystal light valve is a type of reflecting the light. It should be noted that the light modulation device is not limited to the liquid crystal panel or the like, but can also be a light modulation device using, for example, micro-mirrors.

Further, although in the embodiment described above, there is cited the example of the projector 500D using the three liquid crystal panels 560R, 560G, and 560B (the liquid crystal light valves 330R, 330G, and 330B), the invention can be applied to a projector using a single liquid crystal panel alone, or a projector using four or more liquid crystal panels.

Further, the configurations described hereinabove can arbitrarily be combined with each other within a range in which the configurations do not conflict with each other.

The entire disclosure of Japanese Patent Application No.: 2015-053036, filed Mar. 17, 2015 and 2015-053037, filed Mar. 17, 2015 are expressly incorporated by reference herein.

What is claimed is:

1. A projector comprising:
a discharge lamp having a light emitting tube and configured to emit light;
a light modulation device configured to modulate the light emitted from the discharge lamp in accordance with an image signal;
a projection optical system configured to project the light modulated by the light modulation device;
a first detection section configured to detect ultraviolet light out of the light emitted from the discharge lamp; and
a control section configured to determine a deterioration state of the light emitting tube based on a light intensity of the ultraviolet light detected by the first detection section.

2. The projector according to claim 1, further comprising:
a reflecting mirror configured to reflect a part of the light emitted from the discharge lamp toward a predetermined direction,
wherein the reflecting mirror transmits the ultraviolet light out of the light emitted from the discharge lamp, and
the first detection section detects the ultraviolet light transmitted through the reflecting mirror.

3. The projector according to claim 2, wherein
the first detection section is located on a vertically upper side of the discharge lamp and the reflecting mirror.

4. The projector according to claim 3, further comprising:
a shield member disposed between the first detection section and the reflecting mirror, and configured to block light,
wherein the shield member has an opening section located on a vertically upper side of the discharge lamp.

5. The projector according to claim 1, further comprising:
a reflecting mirror configured to reflect at least a part of the light emitted from the discharge lamp toward a predetermined direction,
wherein the reflecting mirror is attached to a first end portion of the light emitting tube, the first end portion being located on a direction side opposite to the predetermined direction, and
the first detection section is located on the opposite direction side with respect to the first end portion.

6. The projector according to claim 1, further comprising:
a reflecting mirror configured to reflect at least a part of the light emitted from the discharge lamp toward a predetermined direction,
wherein the first detection section detects the ultraviolet light out of the light reflected by the reflecting mirror.

7. The projector according to claim 6, further comprising:
an optical component configured to reflect the ultraviolet light out of the light reflected by the reflecting mirror,
wherein the first detection section detects the ultraviolet light reflected by the optical component.

8. The projector according to claim 1, further comprising:
a filter disposed on a light path of the light entering the first detection section,
wherein the filter transmits the ultraviolet light, and blocks at least a part of light other than the ultraviolet light.

9. The projector according to claim 1, further comprising:
a cooling device configured to cool the discharge lamp,
wherein the control section controls the cooling device based on the deterioration state of the light emitting tube determined.

10. The projector according to claim 1, further comprising:
a discharge lamp drive section configured to supply drive power to the discharge lamp,
wherein the control section controls the discharge lamp drive section based on the deterioration state of the light emitting tube determined.

11. The projector according to claim 1, further comprising:
an external output device configured to output a state signal representing the deterioration state of the light emitting tube to an outside,
wherein the control section makes the external output device output the state signal based on the deterioration state of the light emitting tube determined.

12. A projector comprising:
a discharge lamp having a light emitting tube and configured to emit light;
a light modulation device configured to modulate the light emitted from the discharge lamp in accordance with an image signal;
a projection optical system configured to project the light modulated by the light modulation device;
a second detection section configured to detect predetermined visible light out of the light emitted from the discharge lamp, the predetermined visible light includes a first visible light and a second visible light different in wavelength from the first visible light; and
a control section configured to determine a deterioration state of the light emitting tube based on a light intensity of the predetermined visible light detected by the second detection section,
wherein the control section determines the deterioration state of the light emitting tube based on a ratio between a light intensity of the first visible light and a light intensity of the second visible light.

13. The projector according to claim 12, wherein
the first visible light is light in a short wavelength band, and
the second visible light is light in a long wavelength band.

14. The projector according to claim 12, wherein
the predetermined visible light is light in a short wavelength band.

15. The projector according to claim 12, further comprising:
a reflecting mirror configured to reflect the light emitted from the discharge lamp toward a predetermined direction; and
an optical component to which light reflected by the reflecting mirror is input,
wherein the second detection section is located on a light path between the reflecting mirror and the optical component.

16. The projector according to claim 12, wherein
the second detection section detects the predetermined visible light out of the light emitted from the projection optical system.

17. The projector according to claim 16, wherein
the control section determines the deterioration state of the light emitting tube based on a light intensity of the predetermined visible light and a deterioration state of the light modulation device.

18. The projector according to claim 12, wherein
the control section determines the deterioration state of the light emitting tube based on a light intensity of the predetermined visible light and an inter-electrode voltage of the discharge lamp.

19. The projector according to claim 12, wherein
the second detection section is located on a light path between the discharge lamp and the light modulation device.

20. A method of controlling a projector including a discharge lamp having a light emitting tube and configured to emit light, and configured to modulate the light from the discharge lamp and project the modulated light, the method comprising:
   detecting ultraviolet light out of the light emitted from the discharge lamp; and
   determining a deterioration state of the light emitting tube based on a light intensity of the ultraviolet light detected.

* * * * *